(12) United States Patent
Kinkade

(10) Patent No.: US 11,816,262 B1
(45) Date of Patent: Nov. 14, 2023

(54) SYSTEMS AND METHODS FOR MODIFYING A USER INTERFACE BASED ON EYE FOCUS

(71) Applicant: Illuscio, Inc., Culver City, CA (US)

(72) Inventor: Kyle Kinkade, Mountlake Terrace, WA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/183,680

(22) Filed: Mar. 14, 2023

(51) Int. Cl.
    *G06F 3/01*     (2006.01)
    *G06F 3/04815*     (2022.01)

(52) U.S. Cl.
    CPC .......... *G06F 3/013* (2013.01); *G06F 3/04815* (2013.01); *G06F 2203/04804* (2013.01)

(58) Field of Classification Search
    None
    See application file for complete search history.

(56) References Cited

U.S. PATENT DOCUMENTS

| | | | | |
|---|---|---|---|---|
| 10,715,746 B2 * | 7/2020 | Jhawar | ............... | H04N 5/2621 |
| 2014/0361996 A1 * | 12/2014 | Eden | ............... | G06F 3/013 |
| | | | | 345/173 |
| 2015/0243082 A1 * | 8/2015 | Ueno | ............... | G02B 27/0172 |
| | | | | 345/633 |
| 2016/0202756 A1 * | 7/2016 | Wu | ............... | G06F 3/0304 |
| | | | | 382/103 |
| 2017/0178356 A1 * | 6/2017 | Bhuruth | ............... | G06T 13/00 |
| 2018/0015810 A1 * | 1/2018 | Chelian | ............... | B60R 1/04 |
| 2018/0041695 A1 * | 2/2018 | Park | ............... | A63F 13/833 |
| 2018/0325619 A1 * | 11/2018 | Rauniyar | ............... | G16H 20/40 |
| 2019/0094554 A1 * | 3/2019 | Benesh | ............... | G06T 11/001 |
| 2019/0279407 A1 * | 9/2019 | McHugh | ............... | G06F 3/011 |
| 2019/0311199 A1 * | 10/2019 | Mukherjee | ............... | G06T 7/75 |
| 2021/0097776 A1 * | 4/2021 | Faulkner | ............... | G06F 3/011 |
| 2022/0326771 A1 * | 10/2022 | Pearce | ............... | A61B 5/7267 |

* cited by examiner

*Primary Examiner* — Toan H Vu
(74) *Attorney, Agent, or Firm* — Ansari Katiraei LLP; Arman Katiraei; Sadiq Ansari

(57) ABSTRACT

Disclosed is a computing system and associated methods that use changes in eye focus or the depth at which a user is looking to modify a user interface. The computing system presents a three-dimensional ("3D") environment with different user interface ("UI") elements that are positioned in a foreground or near plane of the 3D environment and that partially or wholly obscure a background or far plane of the 3D environment. The computing system detects a change in user eye focus from the foreground to the background by using a sensor to track changes to the pupil or the amount of light reflecting off the user's eye. The computing system produces an unobstructed view to all or part of the background by adjusting positioning, opacity, or other properties of the UI elements in the foreground in response to detecting the change in the user eye focus.

21 Claims, 8 Drawing Sheets

SYSTEMS AND METHODS FOR MODIFYING A USER INTERFACE BASED ON EYE FOCUS

BACKGROUND

Virtual reality, augmented reality, mixed reality, spatial computing, and/or other three-dimensional ("3D") environments present windows, objects, and/or other user interface ("UI") elements at different planes or depths. UI elements in the 3D environment foreground may restrict the view of the 3D environment background. For instance, the 3D environment background may include other UI elements or a view of a real-world scene that is wholly or partially obscured by the UI elements in the 3D environment foreground.

Hand gestures, 3D controllers, and keyboards may be used to reveal the 3D environment background. For instance, the user provides hand-generated inputs to change what is presented in the 3D environment or the layering of UI elements in the 3D environment. The hand gestures, 3D controller inputs, and/or keyboard inputs may not be intuitive actions for changing what is presented in the 3D environment and/or for switching between the 3D environment foreground and background. Specifically, the hand gestures, 3D controllers, and keyboards require discrete inputs that are generated with the user's hands to change the presentation of the 3D environments or the UI elements presented therein.

DETAILED DESCRIPTION OF PREFERRED EMBODIMENTS

The following detailed description refers to the accompanying drawings. The same reference numbers in different drawings may identify the same or similar elements.

Provided are systems and methods for modifying a user interface ("UI") based on eye focus. The systems and methods track a user's eye focus or the depth at which the user is looking, and automatically perform one or more UI actions based on the eye focus. Specifically, the UI actions are implemented without requiring separate hand-generated input from hand gestures, three-dimensional ("3D") controllers, keyboards, and/or other input devices operated with the user's hand. The one or more UI actions include adjusting the positioning or transparency of UI elements in the foreground in order to reveal the UI elements or the scene at different depths or planes in the background.

Tracking and performing UI actions based on eye focus differs from performing UI actions based on eye positioning. Eye positioning involves tracking the x and y positions of the user's eyes in order to determine which UI element or where the user is looking. Eye positioning does not involve tracking the z-depth or distance at which the user is looking or what depths are in focus.

Eye focus relies principally on the z-depth or distance of the user's focus to perform different UI actions. In some embodiments, the eye focus tracking is combined with the eye position tracking to perform additional UI actions or to perform additional interactions with a 3D environment that do not require or involve hand-generated inputs.

Figure 1:
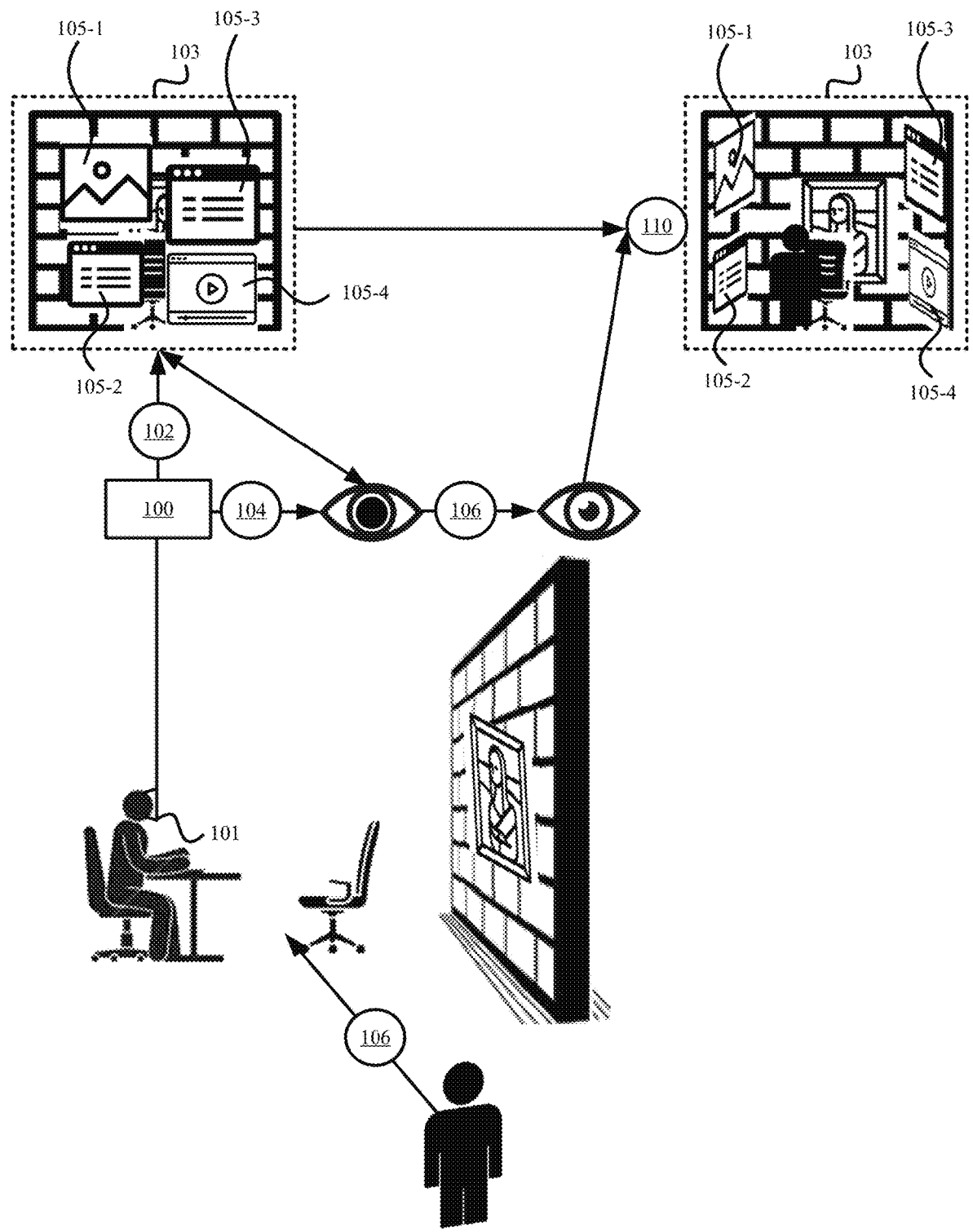
FIG. 1 illustrates an example of performing a user interface ("UI") action based on eye focus tracking in accordance with some embodiments presented herein.

FIG. 1 illustrates an example of performing a UI action based on eye focus tracking in accordance with some embodiments presented herein. In this example, a user wears a mixed reality or augmented reality headset or device 101. Headset or device 101 includes and/or executes 3D UI controller 100.

3D UI controller 100 generates and/or presents (at 102) interactive 3D environment 103 in a display of headset of device 101. Interactive 3D environment 103 includes a set of UI elements 105-1, 105-2, 105-3, and 105-4 (hereinafter collectively referred to as "set of UI elements 105" or individually as "UI element 105") distributed within a near plane or foreground of interactive 3D environment 103. Set of UI elements 105 include windows of different applications or programs, files, media content, and/or different interactive objects.

Set of UI elements 105 partly or wholly obscure the background or far plane of interactive 3D environment 103. In the visualization generated by mixed reality or augmented reality headset or device 101, the background is partly or wholly made up a real-world scene that is in front of the user. Interactive 3D environment 103 presents set of UI elements 105 over the real-world scene. In some embodiments, the background of interactive 3D environment 103 may include additional UI elements for other windows or objects that are virtually positioned behind set of UI elements 105 in the foreground or near plane. In a virtual reality headset or device, the background may be generated from captured images of the real-world scene in front of the user or a digital scene that is partly or wholly obscured by set of UI elements 105 in the foreground.

3D UI controller 100 tracks (at 104) the user's eye focus, and retains set of UI elements 105 in the foreground of interactive 3D environment 103 so long as the user's eye focus remains on the foreground and/or at the depth of one or more of the set of UI elements 105.

A person enters (at 106) in the background of the user's field-of-view causing the user's eye focus to shift from the foreground to the background. 3D UI controller 100 detects (at 108) the change in the user's eye focus using one or more sensors in headset or device 101, and adjusts (at 110) interactive 3D environment 103 in response. For instance, 3D UI controller 100 detects (at 108) that the foreground of interactive 3D environment 103 or one or more planes at a closer first set of depths is not in focus, and/or that the background of the interactive 3D environment or one or more planes at a distant second set of depths is in focus based on measurements of the user's eyes (e.g., the size, shape, reflected light, and/or other properties of the user's pupils).

3D UI controller 100 determines that set of UI elements 105 are in the foreground or positioned at the closer first of depths based on z-coordinate values associated with each UI element of the set of UI elements 105, and adjusts (at 110) set of UI elements 105 in the foreground so as to not obscure the background that the user has shifted focus to. As shown in FIG. 1, 3D UI controller 100 performs an action that moves set of UI elements 105 from the user's line-of-sight to the periphery of the user's sight (e.g., the top, bottom, left, or right sides). The movements may include shrinking and/or rotating each UI element 105 on a particular axis so that each UI element 105 is presented at a size and/or angle that obscures less of interactive 3D environment 103. In some embodiments, moving set of UI elements 105 includes minimizing each UI element 105 so that they are removed from the display. In some embodiments, 3D UI controller 100 adjusts (at 110) the opacity or alpha-channel of each UI element from set of UI elements 105 so that each UI element 105 becomes partially or wholly transparent and does not obstruct the user's line-of-sight to the background.

As a result of adjusting (at 110) set of UI elements 105 in the foreground, 3D UI controller 100 opens or clears the user's line-of-sight to the interactive 3D environment background and/or any UI elements positioned at the distant second set of depths. 3D UI controller 100 executes the UI action based on the user changing eye focus from the foreground or near plane to the background or far plane without any hand-generated input provided by the user via a hand gesture, 3D controller, keyboard, or other input device. In other words, the user simply and intuitively focuses on something in the background, and 3D UI controller 100 automatically adjusts (at 110) interactive 3D environment 103 to present the background unobstructed to the user.

The user may engage in conversation or interact with the person in the background. To return set of UI elements 105 back to the user's line-of-sight, the user simply shifts eye focus from the background or the distant second set of depths to the foreground or closer first set of depths. 3D UI controller 100 detects the eye focus shifting back to the foreground, and adjusts set of UI elements 105 to their original positions in the user's line-of-sight.

Figure 2:
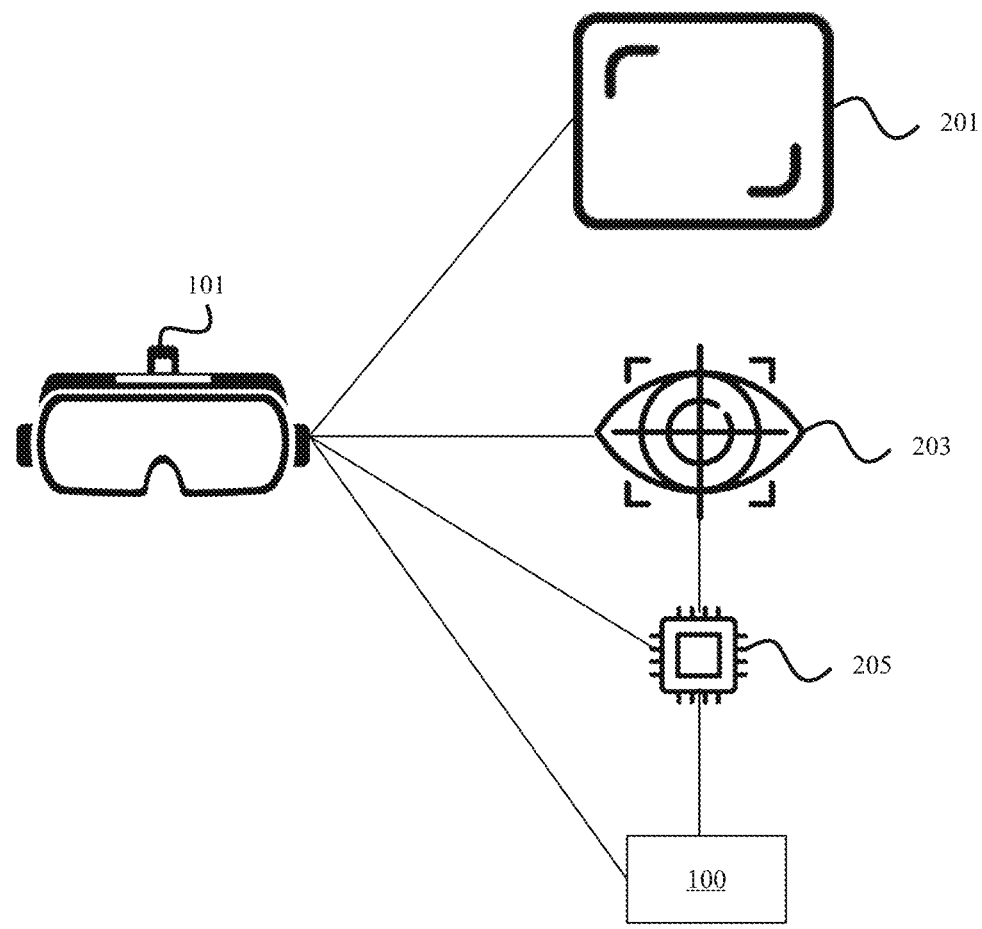
FIG. 2 illustrates example components of a device for performing the UI adjustments based on tracked changes to the user's eye focus in accordance with some embodiments presented herein.

FIG. 2 illustrates example components of device 101 for performing the UI adjustments based on tracked changes to the user's eye focus in accordance with some embodiments presented herein. Device 101 includes display 201, eye focus tracking sensor 203, and 3D UI controller 100 that is implemented by one or more hardware processors 205 of device 101 or a computing device that is connected to device 101.

In some embodiments, device 101 is a headset, glasses, or other wearable device that is positioned before the user's eyes or face. In some other embodiments, device 101 is a tablet, desktop computer, or other computing device that creates a virtual reality, mixed reality, augment reality, spatial computing, or other 3D experience without being tied to the user body.

Device 101 may include additional components depending on the usage model. For instance, device 101 includes a camera to capture a real-world scene in front of the user and to generate a virtual reality, mixed reality, or augmented reality experience with UI elements presented in combination with the real-world scene. Device 101 includes memory, storage, network, and/or other hardware resources for onboard execution of 3D UI controller 100 or for remote streaming of the UI elements or the 3D UI environment to device 101.

Display 201 presents different UI elements in a virtual reality, mixed reality, augmented reality, spatial computing, or other 3D environment. The UI elements include digital features of the 3D environment that present data or may be interacted with to perform different functionality. For instance, the UI elements may include windows of open or running applications, windows of open images, audio, media, and/or other files, icons for accessing the applications, files, and/or data, icons for invoking or executing different functionality or commands, interactive gaming elements, digital objects or artifacts, and/or other interactive or viewable elements that may be overlaid or otherwise presented at different positions in the 3D environment.

Eye focus tracking sensor 203 is directed towards the user's eyes. Eye focus tracking sensor 203 tracks eye focus based on one or more measurements obtained from one or more of the user's eyes. In some embodiments, eye focus tracking sensor 203 includes an emitter that generates non-visible light for measuring the eye focus. In some embodiments, eye focus tracking sensor 203 includes a receiver that captures images or performs different measurements of the user's eyes for the eye focus determination.

3D UI controller 100 receives the output from eye focus tracking sensor 203, and determines the eye focus or changes to the eye focus based on the sensor output. For instance, 3D UI controller 100 computes a distance measurement or depth range that the user eye is focusing on, or tracks the user focus transitioning between near and far planes.

3D UI controller 100 includes an interface to the 3D environment presented in display 201. In particular, 3D UI controller 100 includes an interface to the window manager of the 3D environment or operating system. 3D UI controller 100 controls the presentation of UI elements in the 3D environment using the interface and based on tracked changes to the eye focus. For instance, 3D UI controller 100 issues commands to the window manager via the interface to adjust the positioning or opacity of the UI elements at different distance or depths in the 3D environment. In some embodiments, 3D UI controller 100 performs other actions including closing, opening, saving, changing the frontmost UI element or UI element that has key-focus (e.g., the UI element that receives user inputs), and/or otherwise changing the UI element selection.

Figure 3:
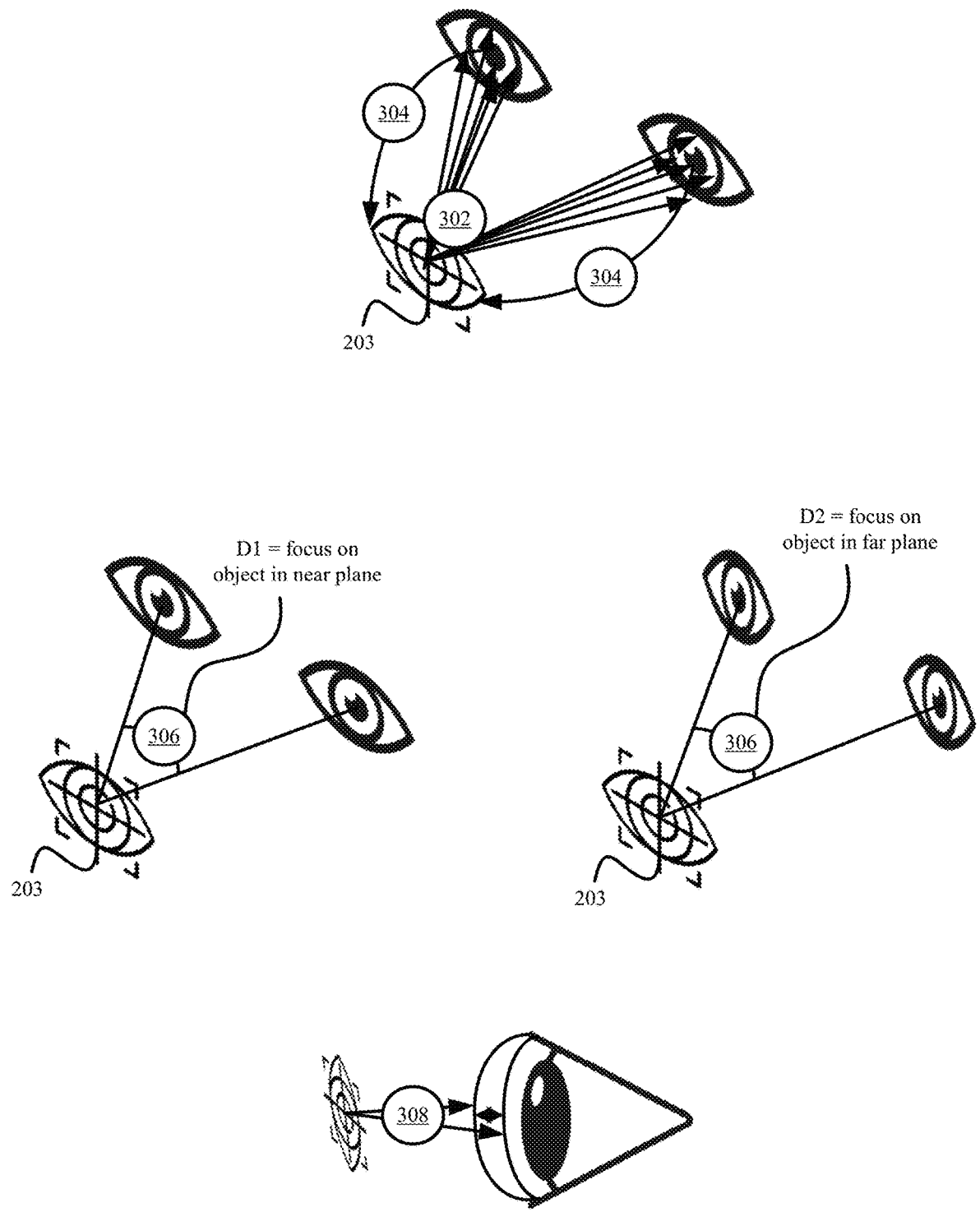
FIG. 3 illustrates eye tracking examples performed by an eye focus tracking sensor in accordance with some embodiments presented herein.

FIG. 3 illustrates eye tracking examples performed by eye focus tracking sensor 203 in accordance with some embodiments presented herein. Eye focus tracking sensor 203 illuminates (at 302) the pupil of the user eye with invisible near-infrared or infrared light using a light emitter or light source. The emitted light does not irritate or interfere with the user eye or user vision.

Eye focus tracking sensor 203 records and/or measures (at 304) the amount of light reflecting off the pupil to determine the pupil size or narrowing or expansion of the pupil. From the pupil size or changes to the pupil size, eye focus tracking sensor 203 and/or 3D UI controller 100 determines the eye focus or the depth at which the eye is focused on or whether the user changes focus from a near plane to a far plane or vice versa.

In some embodiments, eye focus tracking sensor 203 measures (at 306) the distance between the eyes. Specifically, eye focus tracking sensor 203 measures (at 306) the center positions of the eyes relative to one another as the eyes focus on close and far objects. When a user is focused on a near plane (e.g., objects or UI elements that are close or a first set of distances from the user), the eyes rotate or turn closer together such that the angle separating the eyes and the in-focus object is more acute or smaller. When a user is focused on a far plane (e.g., objects or UI elements that are far or a second set of distances from the user), the eyes rotate or turn away from one another such that the angle separating the eyes and the in-focus object is larger.

In some embodiments, eye focus tracking sensor 203 images or measures (at 308) the surface curvature of the eye lens. For instance, the lens becomes less concave or curved as the eye focuses on a closer object, and becomes more concave or curved as the eye focuses on a farther object.

These eye focus tracking techniques differ from eye positional tracking techniques that track the x and y positions of the eyes to determine where about a two-dimensional plane the user is looking. In contrast, the eye focus tracking techniques implemented by eye focus tracking sensor 203 and used by 3D UI controller 100 are unconcerned with the x and y position where the user is looking, and measure or determine the depth, plane, or z-coordinate that is in focus.

Figure 4:
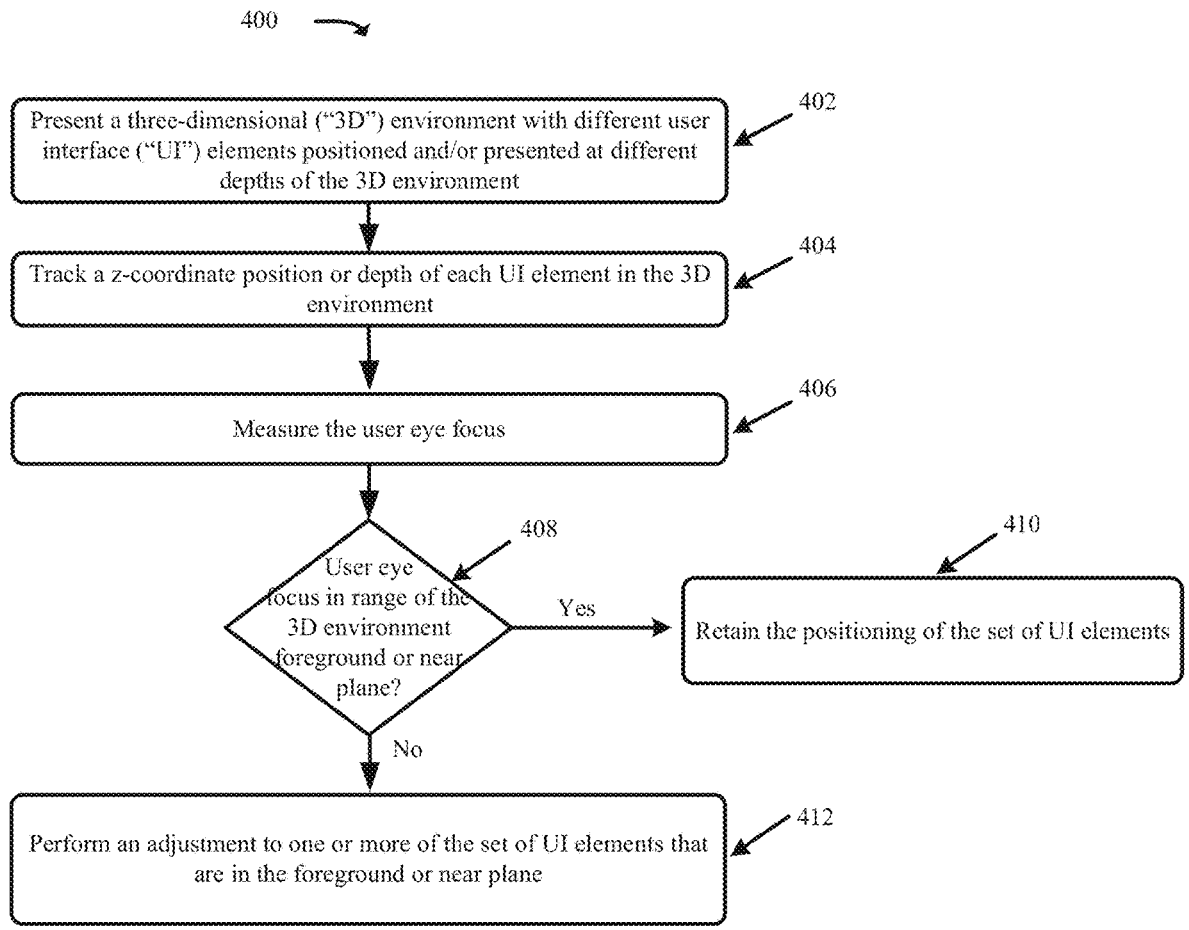
FIG. 4 presents a process for controlling a UI using eye focus in accordance with some embodiments.

FIG. 4 presents a process 400 for controlling a UI using eye focus in accordance with some embodiments. Process 400 is implemented by 3D UI controller 100 as part of a system or device that generates a 3D environment or 3D UI, and that tracks user eye focus with eye focus tracking sensor 203.

Process 400 includes presenting (at 402) a 3D environment with different UI elements positioned and/or presented at different depths of the 3D environment. Presenting (at 402) the 3D environment includes generating the UI elements in a digitally created 3D scene or in a real-world scene. Accordingly, the 3D environment may be a mixed reality, a virtual reality, an augmented reality, a spatial computing, 3D graphical user interface ("GUI"), operating system, or other environment for selecting, moving, opening, closing, and/or otherwise interacting with the different UI elements.

Process 400 includes tracking (at 404) a z-coordinate position or depth of each UI element in the 3D environment. In some embodiments, each UI element is defined with a set of x, y, and z coordinates in the 3D space of the 3D environment. In some embodiments, the coordinates are defined relative to a current render position or position of the user in the 3D environment. In some embodiments, the UI elements are restricted to positions in the 3D environment foreground or near plane. In some other embodiments, the UI elements may be distributed at any depth or position in the 3D environment.

Process 400 includes measuring (at 406) the user eye focus. Different techniques may be used to determine the distance of the user focus or which depths or planes the user's gaze is focused on or are in focus for the user eye. For instance, the pupil size, pupillary distance between the center of the eyes, amount of light reflecting from the user eye, and/or other techniques may be used to measure (at 406) and/or determine the user eye focus.

Process 400 includes determining (at 408) if the user eye focus is in range of a set of UI elements in the 3D environment foreground or near plane. The set of UI elements may include the frontmost UI elements in the 3D environment that are positioned within a near set of z-coordinate positions, or the z-coordinate position of the UI element with key-focus.

In response to determining (at 408—Yes) that the user eye focus is in range of the set of UI elements in the foreground or near plane, process 400 includes retaining (at 410) the positioning of the set of UI elements unless the user provides explicit input to select, close, move, or otherwise reposition one or more of the set of UI elements. For instance, the user may select and maximize or reposition a particular UI element of the set of UI elements with a hand gesture, mouse input, trackpad input, 3D controller input, keyboard input, or other hand-generated input. Alternatively, the user may select multiple UI elements within a selection window, and may issue a command to minimize, close, or reposition the multiple UI elements with a hand gesture, mouse input, trackpad input, 3D controller input, keyboard input, or other hand-generated input.

In response to determining (at 408—No) that the user eye focus is focused on the 3D environment background or far plane (e.g., a far set of z-coordinate positions that are behind or at a greater depth than the near set of z-coordinate positions), process 400 includes automatically performing (at 412) an adjustment to one or more of the set of UI elements that are in the foreground or near plane. Performing (at 412) the adjustment includes modifying the one or more UI elements to prevent the background or far plane of the 3D environment from being obscured or blocked by the positioning of the one or more UI elements in the foreground or near plane.

In some embodiments, performing (at 412) the adjustment includes presenting UI elements that are in the background or far plane or that are positioned behind the set of UI elements. In some other embodiments, performing (at 412) the adjustment includes providing an unobstructed or minimally obstructed view of the real-world scene behind the set of UI elements.

In some embodiments, performing (at 412) the adjustment includes increasing the opacity of the one or more UI elements to make the one or more UI element transparent and allow the user to see through the one or more UI elements in the foreground. In doing so, the view of the 3D environment background becomes less obstructed through the partially or fully transparent one or more UI elements.

In some embodiments, performing (at 412) the adjustment include repositioning the one or more UI elements to prevent the one or more UI elements from blocking a view of the 3D environment background or far plane. Repositioning the one or more UI elements may include minimizing the UI elements, grouping the UI elements to the sides or corners of the 3D environment, moving the UI elements to the periphery, staggering the UI elements against one another, and/or tilting or rotating the UI elements about one axis such that the UI elements are presented at an angle that allows the region of the 3D environment behind the UI elements to become visible.

In some embodiments, 3D UI controller 100 performs (at 412) the adjustment to the entire set of UI elements in the foreground or near plane of the 3D environment. In some other embodiments, 3D UI controller 100 performs (at 412) the adjustment to the one or more UI elements from the set of UI elements that are at the center of the 3D environment or are positioned in the direction where the user is looking which is determined using one or more eye tracking techniques.

Figure 5:
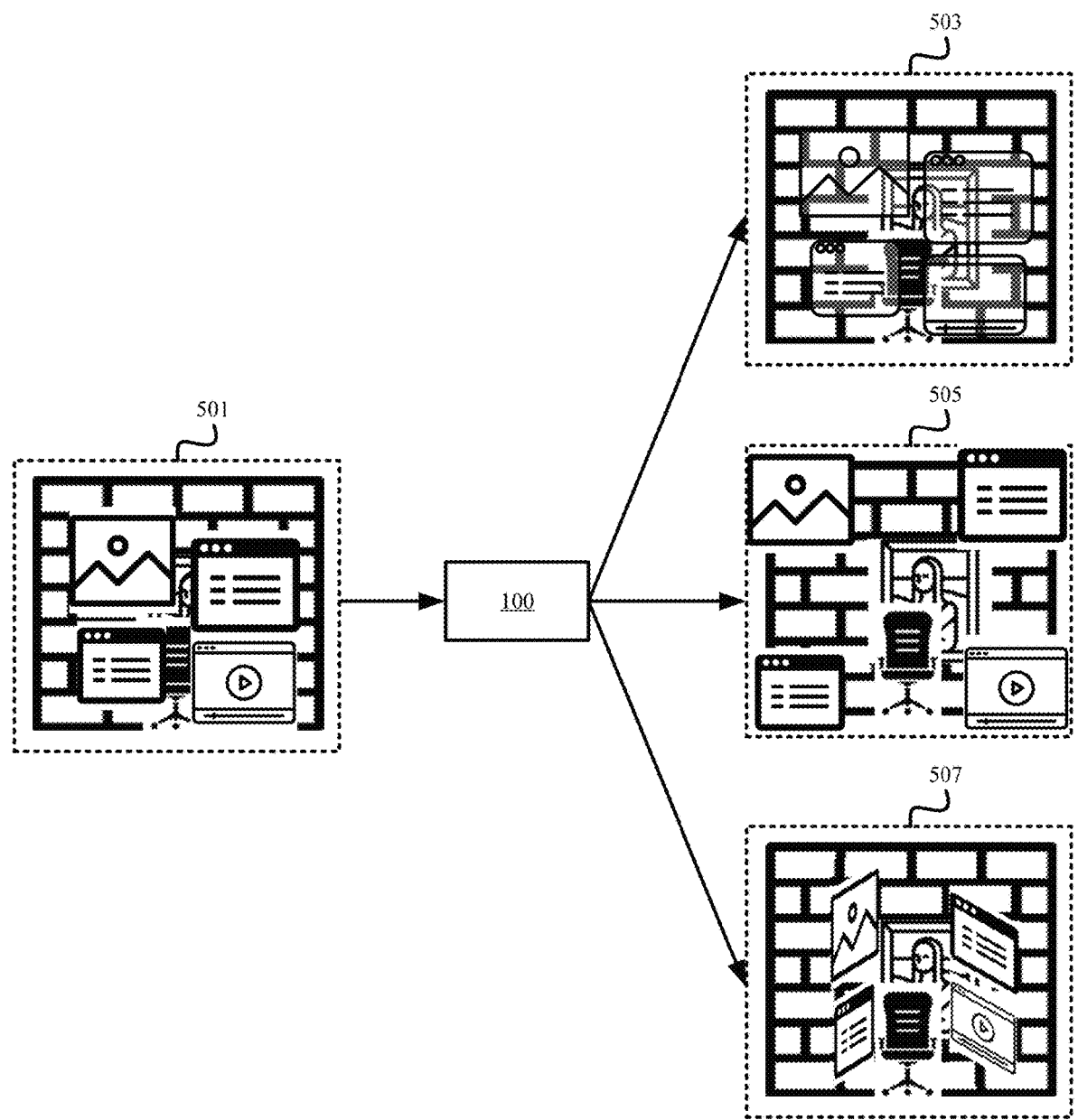
FIG. 5 illustrates examples of the different adjustments for exposing the 3D environment background or far plane in accordance with some embodiments presented herein.

FIG. 5 illustrates examples of the different adjustments for exposing the 3D environment background or far plane in accordance with some embodiments presented herein. Unadjusted 3D environment 501 presents with the set of UI elements in the foreground or near plane obscuring the viewing of the 3D environment background or far plane.

First adjustment 503 illustrates the 3D environment with the transparency of the set of UI elements being increased so that the 3D environment background or far plane is visible through the set of UI elements in the foreground or near plane. Second adjustment 505 illustrates the set of UI elements being repositioned to the periphery so that the center of the 3D environment background or far plane is unobstructed. Third adjustment 507 illustrates the set of UI elements being rotated about an axis so as to block less of the background or far plane.

Figure 6:
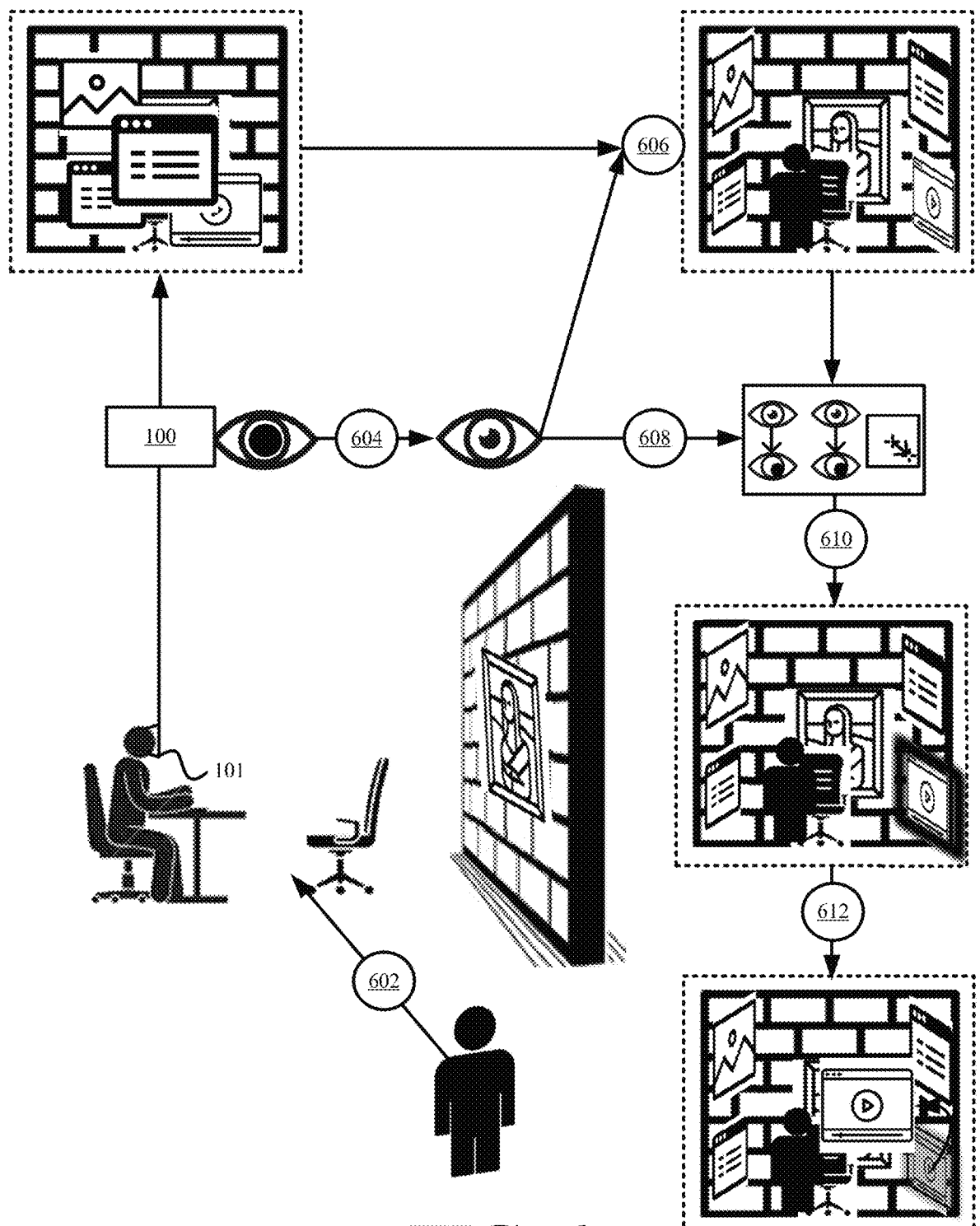
FIG. 6 illustrates an example of different UI adjustments that are implemented based on controls derived from different combinations of eye focus and eye position tracking in accordance with some embodiments presented herein.

In some embodiments, the eye focus tracking may be combined with eye position tracking to implement additional UI controls. FIG. 6 illustrates an example of different UI adjustments that are implemented based on controls derived from different combinations of eye focus and eye position tracking in accordance with some embodiments presented herein.

For instance, the user has a set of application windows open in the 3D environment with a first application window having key-focus and receiving input from the user. A person walks (at 602) into the room, and the user detects the motion via a region of the 3D environment that is not obstructed by the set of application windows.

3D UI controller 100 detects (at 604) the user eye focus changing based output from eye focus tracking sensor 203 of device 101. Specifically, 3D UI controller 100 detects (at 604) the user eye focus changing from the near plane in which the first application window is positioned to the far plane.

In response to the detected (at 604) eye focus change, 3D UI controller 100 moves (at 606) the set of application windows out of the user's line-of-sight. Moving (at 606) the set of application windows provides the user with an unobstructed view of the 3D environment far plane, and the user may engage in conversation with the person that walked into the room.

The conversation may relate to data from a second application window of the set of application windows. The user may look to the repositioned second application window. An eye position tracking sensor of device 101 generates output that 3D UI controller 100 uses to determine (at 608) that the user is looking at an x and y position that is associated with the repositioned second application window.

3D UI controller 100 may highlight (at 610) or otherwise identify that the second application window has been selected based on the eye position tracking. The user may perform an eye tracking gesture (e.g., blink twice) or may continue to stare at the highlighted second application window for a duration of time. In response to the eye tracking input, 3D UI controller 100 adjusts (at 612) the positioning of the second application window next to the person speaking in the background. Consequently, 3D UI controller 100 allows the user to pause work on the first application window, direct focus to the person that the entered room without obstruction from the set of application windows, engage in conversation with the person, and reposition the second application window containing data for the conversation next to the person engaged in the conversation without any hand- generated inputs.

In some embodiments, the eye focus controls may be adapted to perform other functionality beyond providing an unobstructed view of the 3D environment background or far plane. For instance, the eye focus controls may be used to close applications, save application state, cycle between different applications, and/or provide data regarding state in the background.

Figure 7:
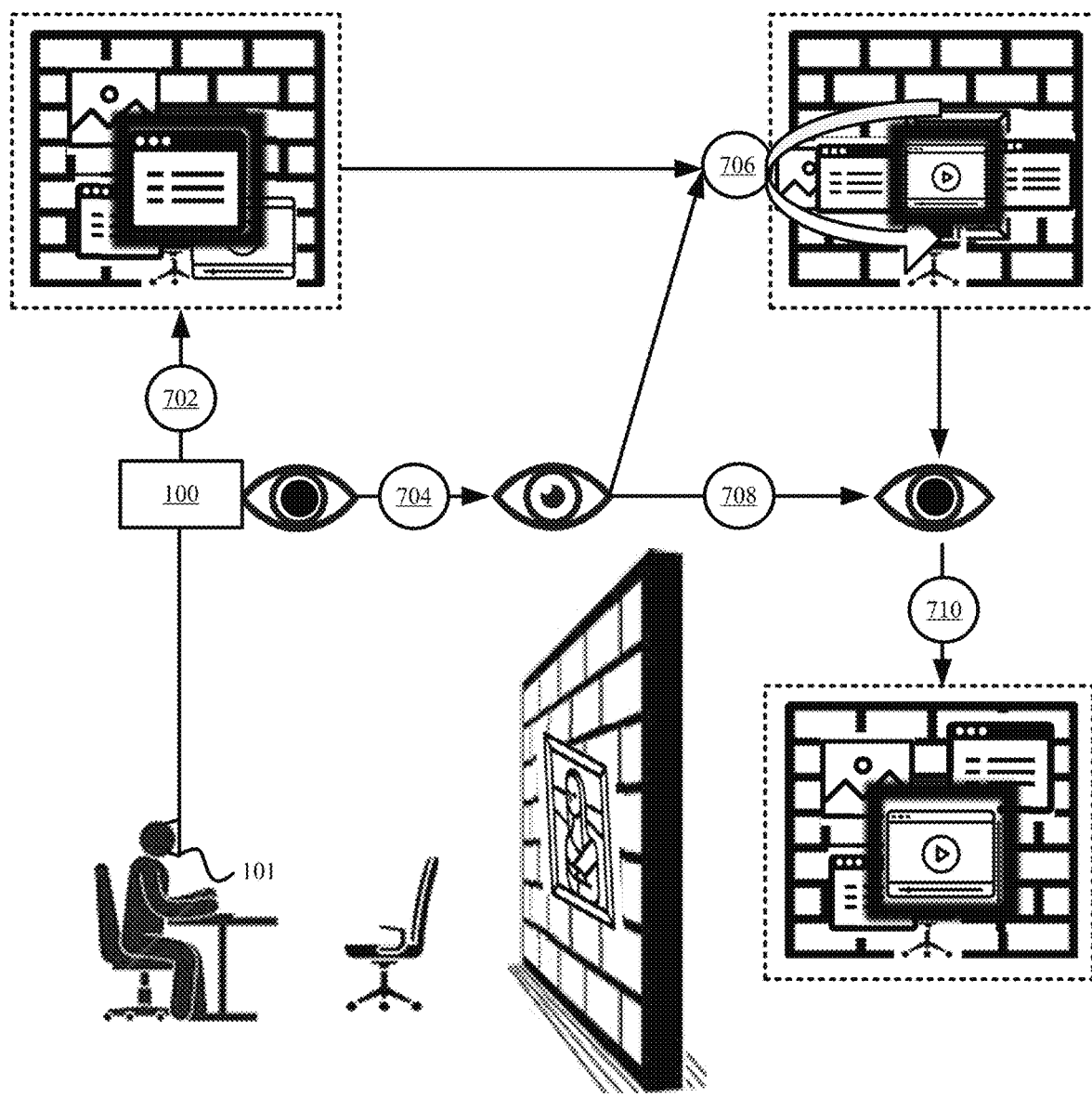
FIG. 7 illustrates an example of adapting the eye focus controls for switching between UI elements in accordance with some embodiments presented herein.

FIG. 7 illustrates an example of adapting the eye focus controls for switching between UI elements in accordance with some embodiments presented herein. The 3D environment presented (at 702) on user device 101 includes a set of UI elements with a first UI element that is frontmost and has key-focus. For instance, the first UI element may be a text editing application for a first document the user is working on.

The user decides to switch from the first UI element to a second UI element and perform operations using the second UI element. In traditional UIs, the user has to locate the second UI element in the 3D environment, and select the second UI element to transfer key-focus from the first UI element to the second UI element. Alternatively, the user may use an Alt-Tab or other keyboard command to cycle through the set of UI elements.

In FIG. 7, 3D UI controller 100 adapts the eye focus controls to allow the user to cycle between UI elements. For instance, the user changes eye focus off the first UI element or the near plane where the first UI element is located, and focuses on the background or far plane of the 3D environment. 3D UI controller 100 detects (at 704) the change in eye focus, and activates (at 706) UI element switching functionality in response to the change in eye focus and/or in response to no person or movement being detected in the far plane.

Activating (at 706) the UI element switching functionality includes arranging the set of UI elements in a specified ordering. The specified ordering may be based on when each UI element was last accessed or the order in which the UI elements were opened. 3D UI controller 100 begins to cycle through the set of UI elements by rotating the set of UI elements and bringing a next UI element in the specified ordering to the background while the user focus remains on the background. For instance, 3D UI controller 100 rotates the set of UI elements every half second the user's focus remains on the background. Since the user's focus is on the background, the user sees the contents of the UI element that is moved to the background and/or selected. When the user identifies the desired second UI element in the background they would like to transfer control to, the user shifts their focus back to the foreground and 3D UI controller 100 detects (at 708) the change in eye focus back to the foreground or near plane.

In response to detecting (at 708) the eye focus changing from the background or far plane back to the foreground or near plane after the second UI element has been selected, 3D UI controller 100 makes (at 710) the second UI element the frontmost UI element, and transfers key-focus to the second UI element such that subsequent inputs provided by the user via one or more input devices are provided to the second UI element instead of the first UI element. The user may continue switching between the set of UI elements in the same manner by shifting eye focus back to the background.

The eye focus tracking may also provide controls for video games and/or multimedia content. For instance, a video game character may be rendered at a far plane or background of a 3D environment. To control and view the character, the user's focus shifts to the far plane or background, and the user uses a game controller to provide hand-generated inputs that move the character in the 3D environment and that cause the character to perform different actions.

Supplemental data about the character or options to change the character properties may be invoked by the user shifting eye focus from the far plane or background to the near plane or foreground. 3D UI controller 100 detects the user eye focus shifting to the near plane or foreground, and in response, generates an overlay that provides the supplemental data about the character or options to change the character properties. For instance, the game may generate an overlay in the foreground with an inventory of items that may be used to customize the character or an overlay that provides health and/or other status about the character. Inputs from the game controller may be diverted to selecting between the options in the overlay. Once a selection is made or the user wishes to return to the game play, the user need only shift their eye focus back to the far plane or background. 3D UI controller 100 detects the eye focus returning to the far plane or background, removes the overlay, and/or transfer inputs from the game controller back to controlling the character gameplay.

In this manner, the eye focus controls may be used to quickly access menus or the supplemental data without hand-generated input or input from the game controller. For instance, the buttons of the game controller may be assigned to other controls.

In some embodiments, similar eye focus controls may be used to edit multimedia content. For instance, an application may playback video content in the far plane or background. When the user wish to perform an edit, the user shifts eye focus to the foreground. 3D UI controller 100 detects the change in eye focus, pauses playback of the video content, and presents various tools for editing the video content in the foreground.

Figure 8:
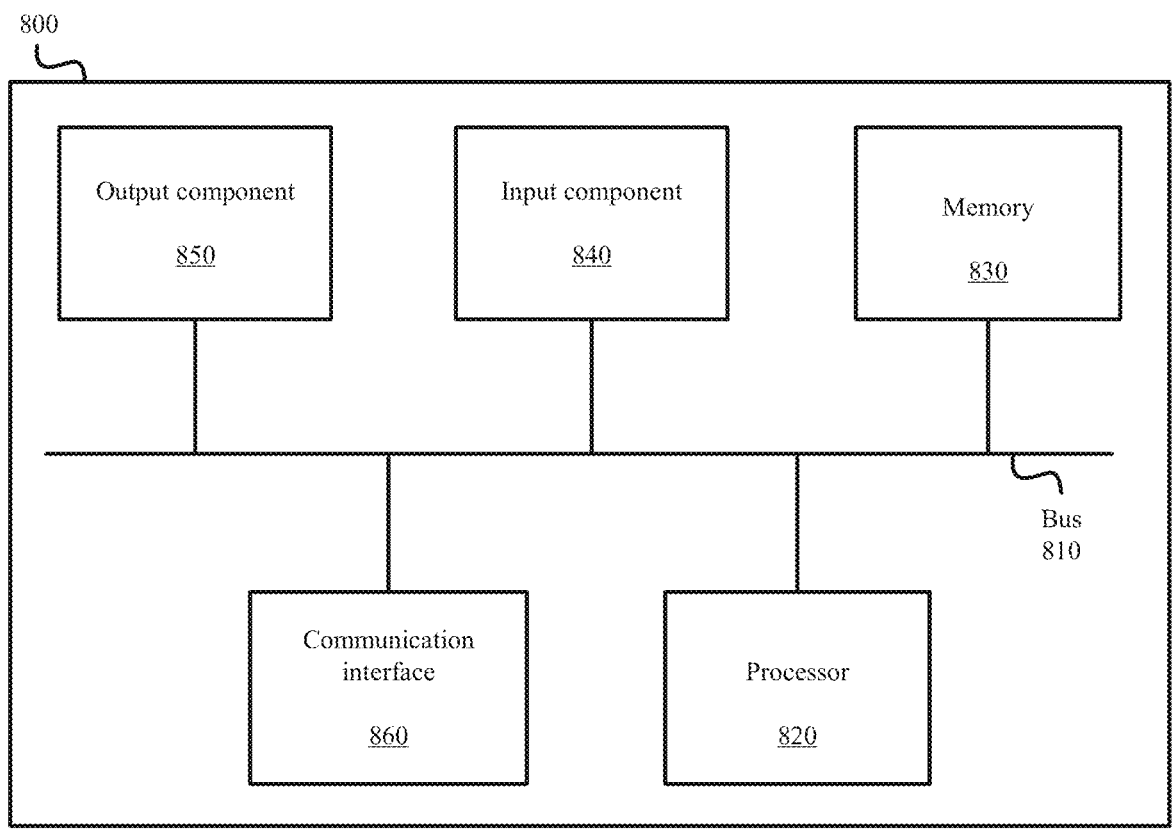
FIG. 8 illustrates example components of one or more devices, according to one or more embodiments described herein.

FIG. 8 is a diagram of example components of device 800. Device 800 may be used to implement one or more of the devices or systems described above (e.g., 3D UI controller 100, device 101). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth ® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold,""being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   presenting a three-dimensional ("3D") environment comprising one or more user interface ("UP") elements that are positioned in a foreground of the 3D environment and that partially or wholly obscure a background of the 3D environment;
   determining that a user eye focus is focused at a first depth corresponding to the foreground of the 3D environment;
   retaining positions of the one or more UI elements in the foreground that partially or wholly obscure the background in response to determining that the user eye focus is focused at the first depth;
   detecting a change in the user eye focus from the foreground to the background; and
   producing an unobstructed view to all or part of the background by adjusting the one or more UI elements in the foreground in response to detecting the change in the user eye focus.

2. The method of claim 1, wherein detecting the change in the user eye focus comprises:
   determining that the user eye focus has shifted from the first depth to a second depth corresponding to the background of the 3D environment.

3. The method of claim 1, wherein detecting the change comprises:
   measuring a change to a pupil with a sensor.

4. The method of claim 1, wherein detecting the change comprises:
   measuring a change in an amount of light being reflected off a user's eye with a sensor.

5. The method of claim 1, wherein producing the unobstructed view comprises:
   increasing a transparency of the one or more UI elements.

6. The method of claim 1, wherein producing the unobstructed view comprises:
   moving the one or more UI elements to a display periphery.

7. The method of claim 1, wherein producing the unobstructed view comprises:
   minimizing the one or more UI elements.

8. The method of claim 1 further comprising:
   detecting a second change in the user eye focus from the background to the foreground; and
   removing said adjusting of the one or more UI elements, wherein said removing comprises returning the one or more UI elements to positions in the foreground prior to said adjusting and to visible properties specified for the one or more UI elements prior to said adjusting.

9. The method of claim 1 further comprising:
   tracking a depth at which the one or more UI elements are positioned in the 3D environment;
   determining that the one or more UI elements are positioned in the foreground of the 3D environment based on said tracking of the depth; and
   issuing a command that adjusts a positioning or opacity of the one or more UI elements in response to determining that the one or more UI elements are positioned in the foreground and the change in the user eye focus from the foreground to the background.

10. A computing system comprising:
    one or more hardware processors configured to:
    present a three-dimensional ("3D") environment comprising one or more user interface ("UP") elements that are positioned in a foreground of the 3D environment and that partially or wholly obscure a background of the 3D environment;
    determine that a user eye focus is focused at a first depth corresponding to the foreground of the 3D environment;
    retain positions of the one or more UI elements in the foreground that partially or wholly obscure the background in response to determining that the user eye focus is focused at the first depth;
    detect a change in the user eye focus from the foreground to the background; and
    produce an unobstructed view to all or part of the background by adjusting the one or more UI elements in the foreground in response to detecting the change in the user eye focus.

11. The computing system of claim 10 further comprising:
    an eye focus tracking sensor that is directed in a direction of a user's eye, wherein the eye focus tracking sensor determines the user eye focus based on one or more of a change to a pupil of the user's eye or a change in an amount of light being reflected off the user's eye.

12. The computing system of claim 11, wherein the computing system is one of a virtual reality, mixed reality, or augmented reality headset.

13. The computing system of claim 10, wherein detecting the change in the user eye focus comprises:
    determining that the user eye focus has shifted from the first depth to a second depth corresponding to the background of the 3D environment.

14. The computing system of claim 10, wherein producing the unobstructed view comprises:
increasing a transparency of the one or more UI elements.

15. The computing system of claim 10, wherein producing the unobstructed view comprises:
moving the one or more UI elements to a display periphery.

16. The computing system of claim 10, wherein producing the unobstructed view comprises:
minimizing the one or more UI elements.

17. The computing system of claim 10, wherein the one or more hardware processors are further configured to:
detect a second change in the user eye focus from the background to the foreground; and
remove said adjusting of the one or more UI elements, wherein said removing comprises returning the one or more UI elements to positions in the foreground prior to said adjusting and to visible properties specified for the one or more UI elements prior to said adjusting.

18. A method comprising:
presenting a three-dimensional ("3D") environment comprising one or more user interface ("UP") elements that are positioned in a foreground of the 3D environment and that partially or wholly obscure a background of the 3D environment;
detecting a first change in a user eye focus from the foreground to the background;
producing an unobstructed view to all or part of the background by adjusting the one or more UI elements in the foreground in response to detecting the change in the user eye focus;
detecting a second change in the user eye focus from the background to the foreground; and
removing said adjusting of the one or more UI elements, wherein said removing comprises returning the one or more UI elements to positions in the foreground prior to said adjusting and to visible properties specified for the one or more UI elements prior to said adjusting.

19. A computing system comprising:
one or more hardware processors configured to:
present a three-dimensional ("3D") environment comprising one or more user interface ("UP") elements that are positioned in a foreground of the 3D environment and that partially or wholly obscure a background of the 3D environment;
detect a change in a user eye focus from the foreground to the background;
produce an unobstructed view to all or part of the background by adjusting the one or more UI elements in the foreground in response to detecting the change in the user eye focus;
detect a second change in the user eye focus from the background to the foreground; and
remove said adjusting of the one or more UI elements, wherein said removing comprises returning the one or more UI elements to positions in the foreground prior to said adjusting and to visible properties specified for the one or more UI elements prior to said adjusting.

20. A method comprising:
presenting a three-dimensional ("3D") environment comprising one or more user interface ("UP") elements that are positioned in a foreground of the 3D environment and that partially or wholly obscure a background of the 3D environment;
tracking a depth at which the one or more UI elements are positioned in the 3D environment;
determining that the one or more UI elements are positioned in the foreground of the 3D environment based on said tracking of the depth;
detecting a first change in a user eye focus from the foreground to the background;
issuing a command that adjusts a positioning or opacity of the one or more UI elements in response to determining that the one or more UI elements are positioned in the foreground and further in response to the change in the user eye focus from the foreground to the background; and
producing an unobstructed view to all or part of the background by adjusting the one or more UI elements in the foreground in response to executing the command.

21. A computing system comprising:
one or more hardware processors configured to:
present a three-dimensional ("3D") environment comprising one or more user interface ("UP") elements that are positioned in a foreground of the 3D environment and that partially or wholly obscure a background of the 3D environment;
track a depth at which the one or more UI elements are positioned in the 3D environment;
determine that the one or more UI elements are positioned in the foreground of the 3D environment based on said tracking of the depth;
detect a first change in a user eye focus from the foreground to the background;
issue a command that adjusts a positioning or opacity of the one or more UI elements in response to determining that the one or more UI elements are positioned in the foreground and further in response to the change in the user eye focus from the foreground to the background; and
produce an unobstructed view to all or part of the background by adjusting the one or more UI elements in the foreground in response to executing the command.

* * * * *